US006866275B1

(12) United States Patent
Puzey

(10) Patent No.: US 6,866,275 B1
(45) Date of Patent: Mar. 15, 2005

(54) VEHICLE SUPPORT ASSEMBLY

(76) Inventor: Michael Roydon Puzey, PO Box 1039, Ferndale (ZA), 2160

( * ) Notice: Subject to any disclaimer, the term of this patent is extended or adjusted under 35 U.S.C. 154(b) by 0 days.

(21) Appl. No.: 10/671,621

(22) Filed: Sep. 29, 2003

(30) Foreign Application Priority Data

Dec. 5, 2002 (ZA) .......................................... 2002/9859

(51) Int. Cl.⁷ .............................................. A63C 17/00
(52) U.S. Cl. ............................... 280/87.05; 280/87.041; 180/220
(58) Field of Search ......................... 280/87.05, 87.041, 280/87.042, 87.021, 87.3; 180/219, 220, 65.1, 65.3, 180, 181

(56) References Cited

U.S. PATENT DOCUMENTS

| | | | | |
|---|---|---|---|---|
| 1,611,307 A | * | 12/1926 | Forse | .................... 280/87.021 |
| 4,799,701 A | | 1/1989 | Lindau et al. | |
| 6,120,044 A | * | 9/2000 | Tsai | ........................ 280/87.05 |
| 6,173,976 B1 | * | 1/2001 | Lee | .......................... 280/87.05 |
| 6,182,988 B1 | * | 2/2001 | Wu | .......................... 280/87.05 |
| 6,206,387 B1 | * | 3/2001 | Tsai | ....................... 280/87.041 |
| 6,428,021 B1 | * | 8/2002 | Tung | ...................... 280/87.041 |
| 6,609,584 B2 | * | 8/2003 | Patmont et al. | ............. 180/220 |

FOREIGN PATENT DOCUMENTS

| | | |
|---|---|---|
| EP | 0 300 650 | 1/1989 |
| EP | 0 362 033 | 4/1990 |
| GB | 2 290 508 | 1/1996 |
| WO | 00/41925 | 7/2000 |

* cited by examiner

Primary Examiner—Lesley D. Morris
Assistant Examiner—L. Lum
(74) Attorney, Agent, or Firm—Wenderoth, Lind & Ponack, L.L.P.

(57) ABSTRACT

A support assembly for a ground-engaging component of a vehicle which includes a base section, a column which is mounted for movement relative to the base section between a traveling position and a storage position, and a locking assembly for holding the column. The locking assembly is capable of locking the column in the traveling position or in a storage position. The assembly also includes an actuator which, when the column is in the traveling position, is movable from a rest position along a release path to initiate a release of the locking assembly, and thereby allow the column to be moved from the traveling position to the storage position.

15 Claims, 3 Drawing Sheets

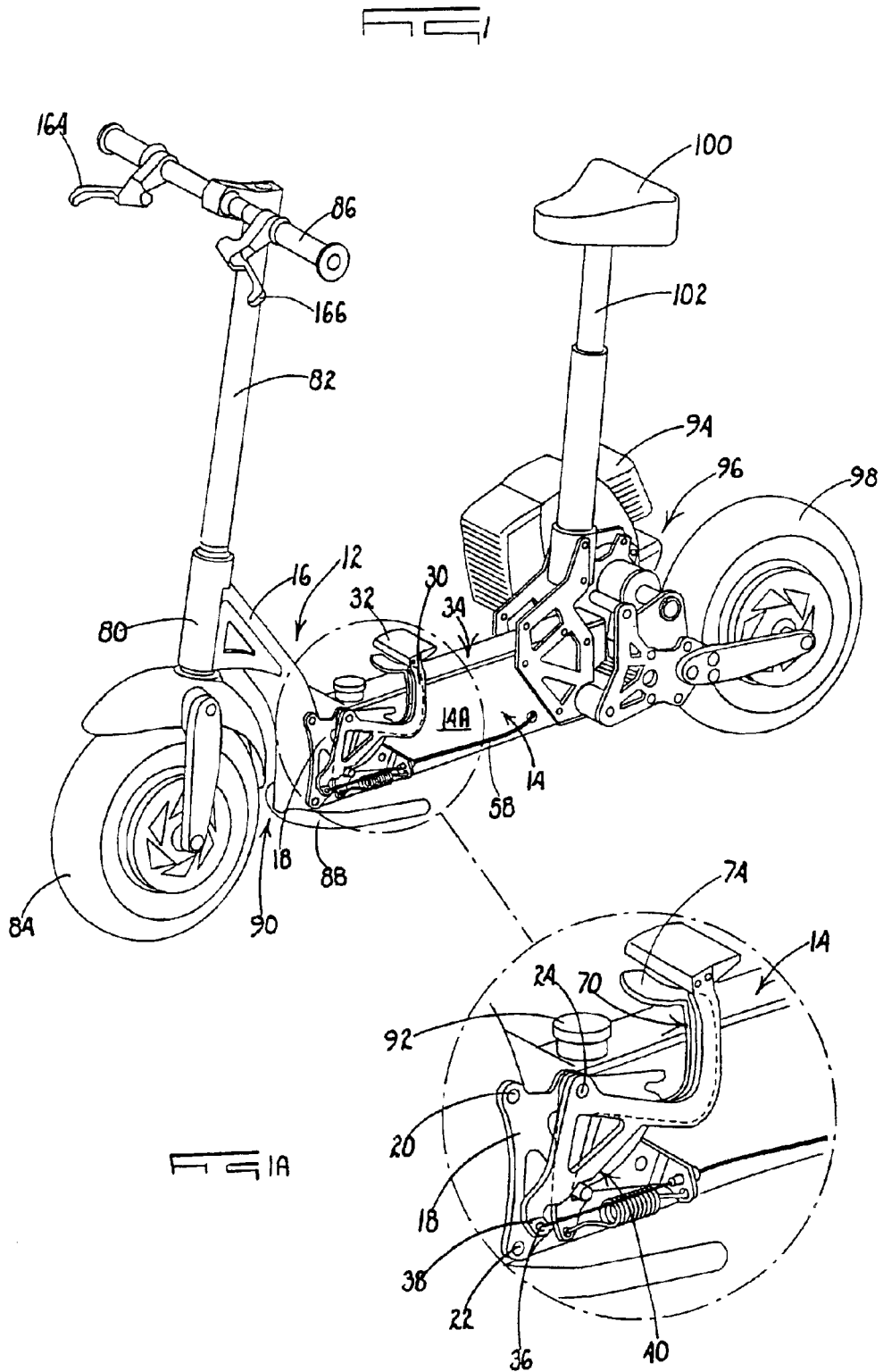

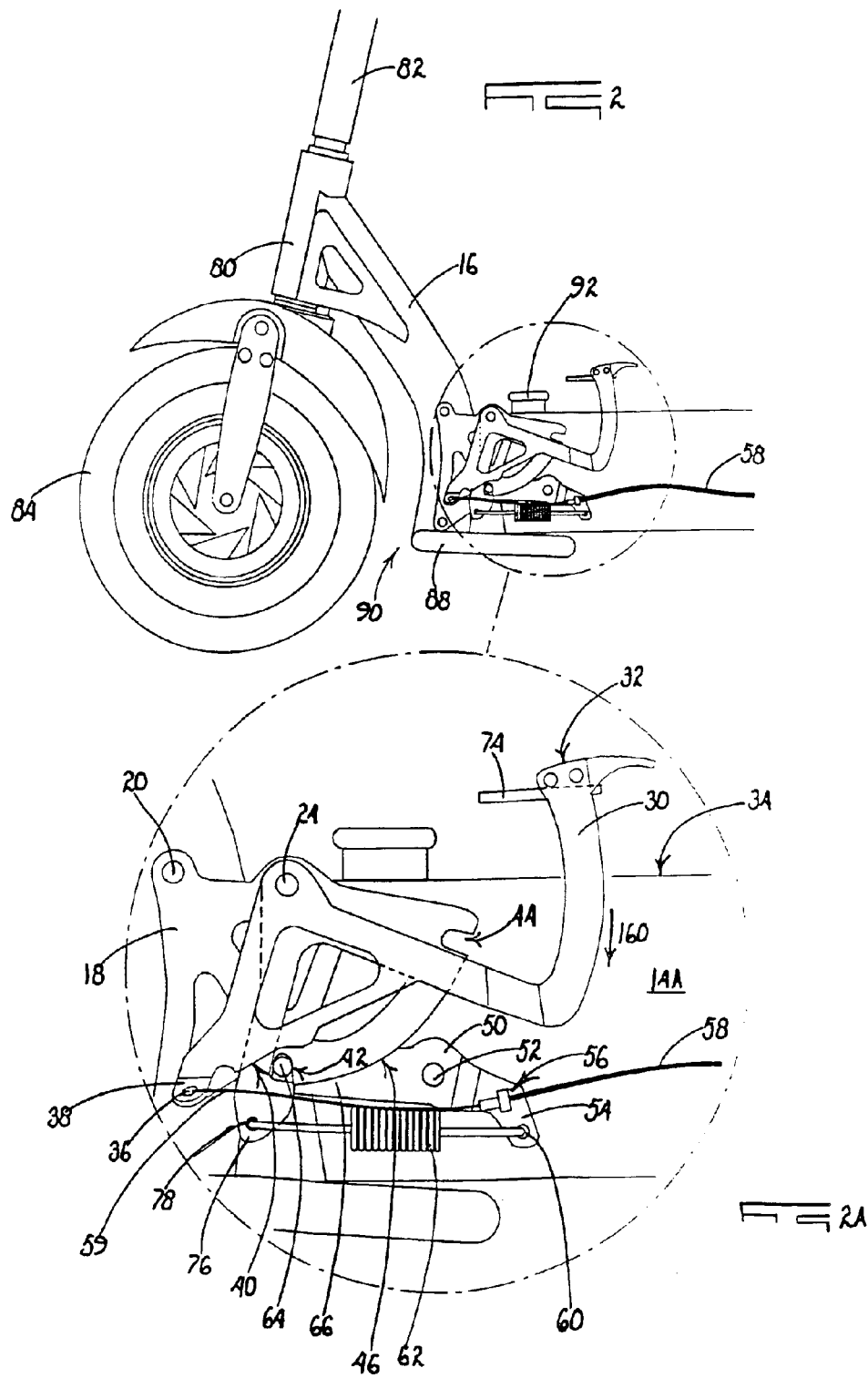

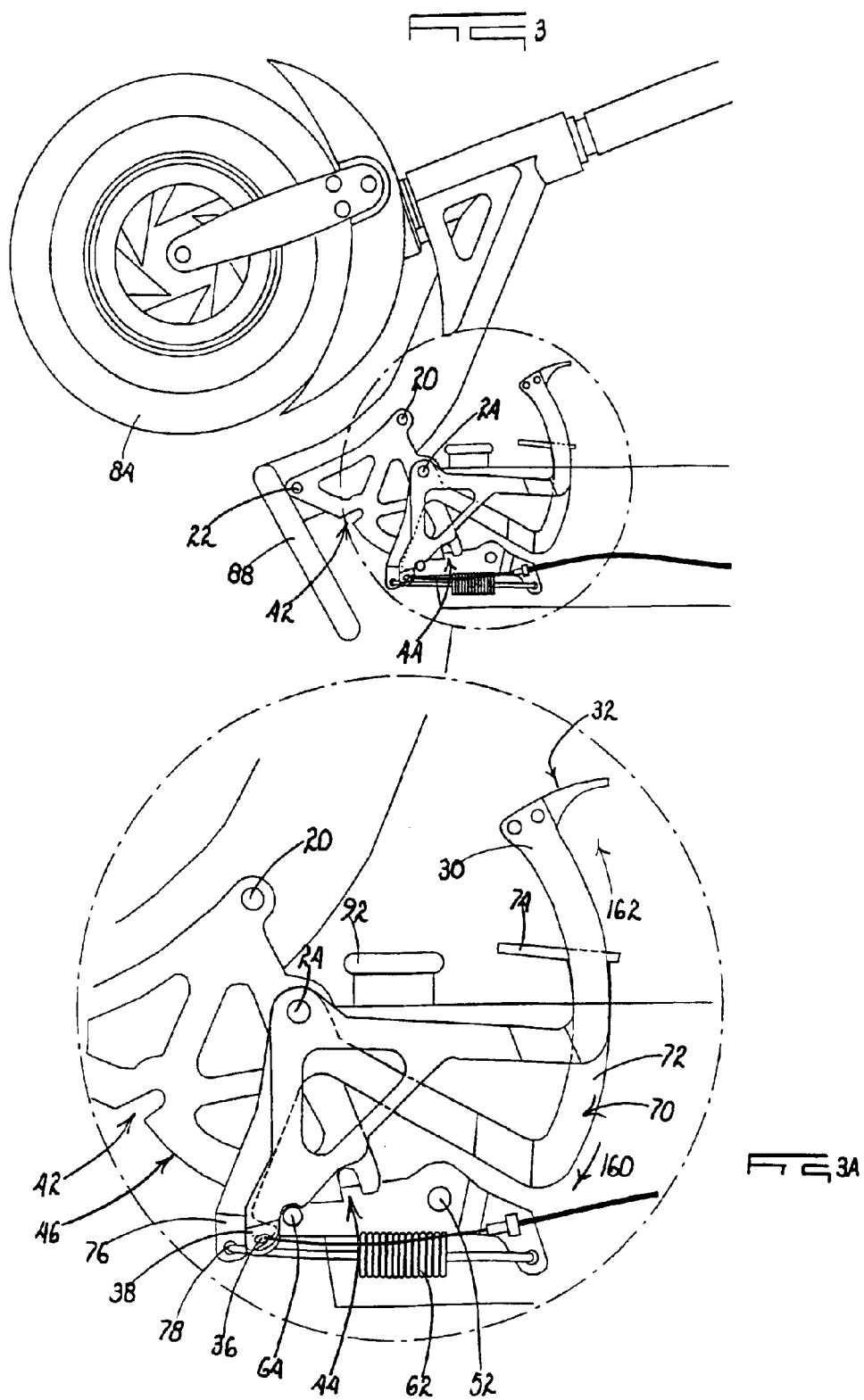

VEHICLE SUPPORT ASSEMBLY

BACKGROUND OF THE INVENTION

This invention relates to a support assembly for a vehicle. As used herein the word "vehicle" includes a scooter, ie. a two-wheeled device, a vehicle which may have three or four wheels, and a non-wheeled vehicle such as a snowboard.

The popularity of small motorized scooters has increased substantially. Although a scooter of this type is generally of compact construction, it is desirable to be able to convert the scooter, with ease, from a storage mode in which the scooter can easily be handled to a travelling mode, and vice versa.

SUMMARY OF INVENTION

The invention provides a support assembly for a ground-engaging component of a vehicle which includes a base section, a column which is mounted for movement relative to the base section between a travelling position and a storage position, a locking assembly for holding the column, according to requirement, in the travelling position or in the storage position, and an actuator. Also, when the column is in the travelling position, the actuator is movable from a rest position along a release path to initiate a release of the locking assembly and thereby allow the column to be moved from the travelling position to the storage position.

The ground-engaging component may be a wheel of the vehicle, e.g. a front wheel, or a board or similar device of a motorized snowboard, snow bike, snow ski or the like. The invention is not limited in this regard.

The support assembly may include a stand which is movable from an inoperative position to an operative position, at which the stand provides support for the vehicle, when the column is moved from the travelling position to the storage position.

The locking assembly may include a connecting member which pivotally connects the column to the base section, and a locking member which is engageable with a first complementary formation on the connecting member thereby to keep the column in the travelling position.

The actuator, when moved along the release path, may cause the locking member to disengage from the first complementary formation.

The locking assembly may include an interlock component which is movable between a first position, at which the interlock component prevents disengagement of the locking member from the first complementary formation, and a second position at which the interlock component allows disengagement of the locking member from the first complementary formation.

The interlock component may be pivotally movable, in a first direction, from the first position to the second position, and the actuator may be pivotally movable, along the release path, in a second direction which is opposite to the first direction, to cause the locking member to disengage from the first complementary formation.

The actuator may be pivotally movable in the first direction to apply a braking force to the vehicle.

The actuator may be a brake pedal.

The interlock component may be movable in unison with the brake pedal, when the brake pedal is moved in the first direction.

The locking member may be engageable with a second complementary formation on the connecting member thereby to keep the column in the storage position.

The base section may take on any appropriate form but preferably includes a fuel tank. The design of the fuel tank may be such that, when the vehicle is a scooter, the fuel tank extends between the front wheel of the scooter and the rear wheel, acting as a structural component and providing support for the feet of a user of the scooter.

The invention also extends to a scooter which includes a base section, a driven rear wheel mounted to the base section, a front wheel, a connecting member which connects the front wheel to the base section and which allows the front wheel to be moved between a ground-engaging position and a storage position, a locking member which is engageable with a first formation to retain the front wheel in the ground-engaging position and with a second formation to retain the front wheel in the storage position, an actuator which is movable from a rest position, in a release direction, to cause the locking member, when engaged with the first formation, to disengage from the first formation and, when the locking member is engaged with the second formation, to disengage from the second formation, and an interlock component which is movable between a first position at which the interlock component prevents the locking member from disengaging at least from the first formation and a second position at which the locking member is disengageable from the first formation.

BRIEF DESCRIPTION OF THE DRAWINGS

The invention is further described by way of example with reference to the accompanying drawings in which:

FIG. 1 is a view in perspective of a scooter which includes a support assembly according to the invention and which has a column, to which is mounted a front wheel of the scooter, in a travelling position;

FIG. 1A shows part of the scooter in enlarged detail;

FIG. 2 is a side view of a portion of the scooter in FIG. 1 illustrating, on an enlarged scale, the construction of the support assembly;

FIG. 2A shows part of the scooter in enlarged detail;

FIG. 3 is a view similar to FIG. 2 showing the support assembly with the column in a storage position; and FIG. 3A shows part of the scooter in enlarged detail.

DESCRIPTION OF PREFERRED EMBODIMENT

FIG. 1 of the accompanying drawings illustrates a scooter 10 which includes a support assembly 12 according to the invention.

FIGS. 2 and 3 show the support assembly in operative and storage modes respectively. The support assembly includes a base section 14, a column 16 and two connecting members or plates 18, only one of which is visible in the drawings, located on opposing sides of the column and connecting the column to the base section.

Each connecting plate 18 is fixed at two points 20 and 22 to the column 16, and at a pivot point 24 to the base section.

A brake pedal 30 is mounted for pivotal movement about the pivot point 24. The brake pedal 30 has two functions. Firstly it functions in a conventional manner to control braking of the vehicle, and secondly it functions as an actuator in an interactive manner with a locking assembly which is used to lock a front wheel of the scooter, according to requirement, in an operative mode or in a storage mode. The brake pedal has a footpad 32 above an upper surface 34 of the base section and at a remote end has an eyelet 36 on an outwardly extending portion 38. A downwardly facing surface 40 of the brake pedal defines a cam surface, the function which is described hereinafter.

The connecting plate 18, on a downwardly facing periphery, is formed with first and second recesses or notches 42 and 44 (see FIG. 2A) respectively and a smoothly curved peripheral portion 46 which extends between the notches.

A locking lever 50 is pivotally mounted to the base section 14 at a pivot point 52. The locking lever includes a reaction section 54 which has a formation 56 to which is mounted a sheath 58 of a brake cable 59 and a hole 60 to which is fixed one end of a coil spring 62. The cable 59 is engaged with the hole 36.

A pin 64 is fixed to an arm 66 of the locking lever 50. The pin is shaped and sized so that it is complementary in shape and size to the notch 42 and the notch 44.

An interlock component 70 is mounted to the base section for pivotal movement about the pivot point 24. The interlock component includes, to one side of the pivot point, an arm 72 which terminates in a plate 74 which underlies the footpad 32 of the brake pedal and, on an opposed side of the pivot point, a hook-shaped formation 76 in which is formed an eyelet 78. An end of the spring 62 is engaged with the eyelet.

The column 16 extends upwardly and is fixed to a collar 80 which provides rotatable support for a steering rod 82 which passes through the column. A front wheel 84 of the scooter is connected to a lower end of the column and a handlebar 86 is fixed to an upper end of the column. The construction of the mounting arrangement for the front wheel and of the steering rod is conventional and is not described in detail herein.

A U-shaped stand 88 is fixed to a lower end 90 of the column 16.

The base section 14 comprises a housing which structurally is strong and which acts as a chassis component for the vehicle. The housing defines a fuel tank which has a filler cap 92 at a forward upper end thereof.

An engine 94 is mounted to a rear side of the base section and, via a drive assembly 96, imparts drive to a rear wheel 98 of the scooter. The brake cable 59 extends to a brake disk (not shown) in the rear wheel 98 and when the cable is tensioned a frictional braking force is applied to the disk to slow the rotational speed of the wheel. These aspects are conventional and consequently are not described herein. Fuel is supplied to the engine from the fuel tank in a known way. A seat 100 is fixed to the rear of the base section, extending from a support 102.

FIG. 1 shows the scooter 10 with the column 16 in a travelling position while FIG. 3 shows the column in a storage position. The column is locked in position, in each case, by the action of a locking assembly which includes the plate 18 with the notches 42 and 44, the pin 64 on the locking lever 50, the interlock component 70 with the hook-shaped formation 76, and the spring 62. As is shown in detail in FIG. 2 the locking pin 64 is engaged with the first notch 42 when the column 16 is in the travelling position. The hook-shaped formation 76 of the interlock component underlies the pin which cannot therefore escape from the notch.

The scooter is used in the normal way in that a user, seated on the seat 100, can drive the scooter as required. When it is necessary to brake the scooter the user depresses the brake pedal 30 by pushing downwardly on the footpad 32 with one of his feet. The pedal then rotates in a first direction 160 (which is downwards or clockwise) about the pivot point 24 and the brake cable 59 is extended, relative to the sheath 58, to brake the rear wheel 98. The plate 74, which underlies the footpad 32, is moved in unison with the footpad, and the interlock component 70 therefore moves in the first direction as well, against the biasing action of the coil spring 62 which normally acts to urge the pedal to a rest position. In so doing the hook-shaped formation 76 is moved away from the underside of the pin 64. The pin cannot however move out from the first notch 42 for, as the spring is extended, an increasing force is applied to the right hand side of the lever 50 which then tends to rotate in a clockwise direction about the pivot point 52, giving rise to a force which urges the pin deeper into the notch.

If the scooter is to be folded into a compact mode for storage purposes then a user must lift the brake pedal from its rest position shown in FIG. 2 to an elevated position shown in FIG. 3. The brake pedal then moves upwardly along a second or release path, pivoting about the point 24 in a second direction 162 which is opposite to the first direction 160 in which braking force is normally generated. At the same time the user must move the plate 74 downwardly ie. in the first direction 160. Effectively therefore the brake pedal is moved in one direction and the interlock component 70 is moved downwardly in an opposing direction. As the interlock component moves downwardly the hook-shaped formation 76 is moved away from the underside of the pin 64. The brake pedal movement on the other hand brings the cam surface 40 into engagement with an upper side of the pin and the pin is thereby moved downwardly and is forced out of the first notch 42. The column 16 with the steering rod 82 and the front wheel 84 can then be pivoted in a clockwise direction, about the point 24, with the pin 64 riding on the curved periphery 46 of the connecting plate 18. Ultimately the locking pin 64 reaches the second notch 44 and it slips into the notch, due to the action of the spring 62 which constantly acts to rotate the lever 50 in a clockwise direction about the point 52, thereby retaining the column 16 in the storage position.

It is to be noted that the stand 88 is, in the process, moved from the inoperative position shown in FIGS. 1 and 2 to an operative position shown in FIG. 3 at which the stand provides support for the vehicle, keeping the vehicle vertically orientated even though the wheel 84 is off the ground.

If the column 16 is to be moved to the travelling position then it is only necessary for the pin to be disengaged from the notch 44 and for the column to be moved in an anticlockwise direction about the pivot point 24 until the pin again re-engages with the first notch 42.

The support assembly allows the brake pedal 30 to be used in a normal manner with the column 16 in the travelling position. As noted, to move the column 16 to the storage position, the brake pedal and the interlock component must be moved in different directions at the same time in order to disengage the pin 64 from the first notch 42.

The base section 14 is designed to allow the locking assembly 12 to be effectively secured to it. The base section preferably is of substantially rectangular shape with sides 14A which are more or less vertical. This facilitates the mounting of the components of the locking assembly in a compact manner adjacent the base section which allows unimpeded movement of the various components of the locking assembly, as necessary.

It is convenient to use the brake pedal, in the manner described, so that it interacts with the locking assembly. This however is only a particular embodiment of a general principle which is that the brake pedal can be replaced by an actuator, which is not usable to apply a braking force to the vehicle, and which is movable upwardly to release the locking assembly so that the interlock 70 can be moved downwardly to allow pivotal movement of the column 16 about the point 24. The actuator could be prevented from moving downwardly from its rest or neutral position, or it could be movable in a manner which is similar to the way in which the pedal is movable. Preferably the actuator is spring loaded, directly or indirectly, so that it tends to go to the rest position. If a separate actuator is used then the brake pedal is independently operable. It then becomes possible to replace the brake pedal which, in the illustrated example, is foot-operated, with a hand-operated lever 164 which is mounted to the handlebar 86 and which acts on the brake cable in a known manner. A second hand-operated lever 166 can be used to operate a front wheel brake (not shown).

What is claimed is:

1. A support assembly for a ground-engaging component of a vehicle which includes a base section, a column which is mounted for movement relative to the base section between a travelling position and a storage position, a locking assembly for holding the column, according to requirement, in the travelling position or in the storage position, the locking assembly including a connecting member which pivotally connects the column to the base section, a locking member which is engageable with a first complementary formation on the connecting member thereby to keep the column in the travelling position, and an interlock component which is pivotally movable in a first direction from a first position, at which the interlock component prevents disengagement of the locking member from the first complementary formation to a second position at which the interlock component allows disengagement of the locking member from the first complementary formation and an actuator, and wherein, when the column is in the travelling position, the actuator is pivotally movable from a rest position along a release path in a second direction which is opposite to the first direction to initiate a release of the locking assembly by causing the locking member to disengage from the first complementary formation and thereby allow the column to be moved from the travelling position to the storage position.

2. A support assembly according to claim 1, further comprising a biasing member which biases the actuator to the rest position.

3. A support assembly according to claim 1, wherein the ground-engaging component is a wheel of the vehicle.

4. A support assembly according to claim 1, further comprising a stand which is movable from an inoperative position to an operative position, at which the stand provides support for the vehicle, when the column is moved from the travelling position to the storage position.

5. A support assembly according to claim 1, wherein the actuator is pivotally movable in the first direction to cause a braking force to be applied to the vehicle.

6. A support assembly according to claim 5, wherein the interlock component is moved in unison with the actuator when the actuator is moved in the first direction.

7. A support assembly according to claim 1, wherein the locking member is engageable with a second complementary formation on the connecting member thereby to keep the column in the storage position.

8. A support assembly according to claim 1, wherein the base section includes a fuel tank.

9. A support assembly according to claim 8, wherein the base section has mounted to it a driven wheel of the vehicle.

10. A scooter which includes a support assembly according to claim 1.

11. A scooter which includes a base section, a driven rear wheel mounted to the base section, a front wheel, a connecting member which connects the front wheel to the base section and which allows the front wheel to be moved between a ground-engaging position and a storage position, a locking member which is engageable with a first formation to retain the front wheel in the ground-engaging position and with a second formation to retain the front wheel in the storage position, an actuator which is pivotally movable from a rest position, in a release direction, to cause the locking member, when engaged with the first formation, to disengage from the first formation and, when the locking member is engaged with the second formation, to disengage from the second formation, and an interlock component which is pivotally movable, in a first direction which is opposite to the release direction, from a first position at which the interlock component prevents the locking member from disengaging at least from the first formation, to a second position at which the locking member is disengageable from the first formation.

12. A scooter according to claim 11, further comprising a biasing member connected between the interlock component and the locking member whereby, when the interlock component is moved in the first direction from the first position towards the second position, the biasing member biases the locking member into closer engagement with at least the first formation.

13. A scooter according to claim 1, wherein the interlock component is caused to move in unison with the actuator, when the actuator is moved in the first direction.

14. A scooter according to claim 1, wherein the actuator is operable to cause a braking force to be exerted on the rear wheel when the actuator is moved in a direction which is opposite to the release direction.

15. A scooter which includes a base section, a driven rear wheel mounted to the base section, a front wheel, a connecting member which connects the front wheel to the base section and which allows the front wheel to be moved between a ground-engaging position and a storage position, a locking member which is engageable with a first formation to retain the front wheel in the ground-engaging position and with a second formation to retain the front wheel in the storage position, an actuator which is pivotally movable from a rest position, in a release direction, to cause the locking member, when engaged with the first formation, to disengage from the first formation and, when the locking member is engaged with the second formation, to disengage from the second formation, and an interlock component which is movable between a first position at which the interlock component prevents the locking member from disengaging at least from the first formation, and a second position at which the locking member is disengageable from the first formation, and wherein the actuator exerts a braking force on the rear wheel when the actuator is moved in a direction which is opposite to the release direction.

* * * * *